(12) United States Patent
Penna Santana et al.

(10) Patent No.: US 12,204,294 B2
(45) Date of Patent: Jan. 21, 2025

(54) AUTO-ADJUSTABLE MACHINE FUNCTIONALITY USING ANALYTICS OF SENSOR DATA

(71) Applicant: KYNDRYL, INC., New York, NY (US)

(72) Inventors: Cesar Penna Santana, Campinas (BR); Carlos Demetrio De Souza, Campinas (BR); Marco Aurelio Stelmar Netto, Sao Paulo (BR); Paulo Henrique Paulin, Florianopolis (BR)

(73) Assignee: Kyndryl, Inc., New York, NY (US)

( * ) Notice: Subject to any disclaimer, the term of this patent is extended or adjusted under 35 U.S.C. 154(b) by 184 days.

(21) Appl. No.: 16/381,351

(22) Filed: Apr. 11, 2019

(65) Prior Publication Data

US 2020/0326669 A1    Oct. 15, 2020

(51) Int. Cl.
*G05B 13/02* (2006.01)
*G06N 20/00* (2019.01)

(52) U.S. Cl.
CPC .......... *G05B 13/0265* (2013.01); *G06N 20/00* (2019.01)

(58) Field of Classification Search
CPC ............................ G06N 20/00; G05B 13/0265
See application file for complete search history.

(56) References Cited

U.S. PATENT DOCUMENTS 5,798,695 A    8/1998   Metalis
6,599,243 B2   7/2003   Woltermann
(Continued)

FOREIGN PATENT DOCUMENTS

CN    103488293 A    1/2014
EP      2711227 A1    3/2014
(Continued)

OTHER PUBLICATIONS

Madni et al., "Architectural Framework for Exploring Adaptive Human-Machine Teaming Options in Simulated Dynamic Environments", Article, Abstract, Received: Nov. 1, 2018; Accepted: Dec. 10, 2018; Published: Dec. 13, 2018, 17 pages, www.mdpi.com/journal/systems, Systems 2018, 6, 44; doi: 10.3390/systems6040044.

(Continued)

*Primary Examiner* — Alicia M. Choi
*Assistant Examiner* — Vi N Tran
(74) *Attorney, Agent, or Firm* — Dan Housley; Andrew M. Calderon; Calderon Safran & Wright P.C.

(57) ABSTRACT

A method, computer system, and a computer program product for a dynamic machine functionality is provided. The present invention may include setting a threshold for a machine. The present invention may include setting one or more features of the machine available to a user based on the set threshold. The present invention may include determining the machine is being operated. The present invention may include collecting a plurality of data based on the machine operation. The present invention may include transmitting the plurality of data to a machine learning (ML) module. The present invention may include analyzing the collected plurality of data using the ML module. The present invention may include determining that at least one machine functionality of the one or more features should be adjusted based on analysis of the collected plurality of data. The present invention may include adjusting the at least one machine functionality.

20 Claims, 5 Drawing Sheets

(56) References Cited

U.S. PATENT DOCUMENTS

| | | | |
|---|---|---|---|
| 7,227,472 | B1 | 6/2007 | Roe |
| 7,692,552 | B2 | 4/2010 | Harrington |
| 8,301,108 | B2 | 10/2012 | Naboulsi |
| 9,135,803 | B1* | 9/2015 | Fields .................... G08B 21/02 |
| 9,292,471 | B2 | 3/2016 | Fung |
| 9,925,872 | B1 | 3/2018 | Alasry |
| 2005/0075970 | A1* | 4/2005 | Doyle .................... G06Q 10/06 705/38 |
| 2006/0200008 | A1 | 9/2006 | Moore-Ede |
| 2007/0173733 | A1 | 7/2007 | Le |
| 2011/0304465 | A1 | 12/2011 | Boult |
| 2012/0083668 | A1 | 4/2012 | Pradeep |
| 2012/0143391 | A1 | 6/2012 | Gee |
| 2012/0212353 | A1 | 8/2012 | Fung |
| 2012/0306637 | A1 | 12/2012 | McGough |
| 2012/0319869 | A1* | 12/2012 | Dorfmann ............... G01C 23/00 340/945 |
| 2013/0131907 | A1 | 5/2013 | Green |
| 2013/0226408 | A1* | 8/2013 | Fung ...................... G08G 1/166 701/1 |
| 2014/0218187 | A1 | 8/2014 | Chun |
| 2015/0106926 | A1* | 4/2015 | Basavapatna ......... G06F 21/552 726/22 |
| 2015/0246673 | A1 | 9/2015 | Tseng |
| 2015/0254955 | A1 | 9/2015 | Fields |
| 2016/0101784 | A1 | 4/2016 | Olson |
| 2016/0196105 | A1 | 7/2016 | Vartakavi |
| 2017/0103465 | A1* | 4/2017 | Zentler .................. G06Q 40/08 |
| 2017/0109829 | A1* | 4/2017 | Amigo ................... A61B 5/1118 |
| 2017/0147952 | A1* | 5/2017 | Kozloski ........... G06Q 10/0635 |
| 2017/0231546 | A1 | 8/2017 | Arbas |
| 2017/0337438 | A1 | 11/2017 | Rana |
| 2017/0374436 | A1* | 12/2017 | Awiszus ................. A62B 18/00 |
| 2018/0012159 | A1* | 1/2018 | Kozloski ................ G06N 20/00 |
| 2018/0126999 | A1 | 5/2018 | Selvaraj |
| 2018/0151049 | A1* | 5/2018 | Chong ............... G06Q 10/0633 |
| 2018/0177436 | A1* | 6/2018 | Chang ................... A61B 5/1117 |
| 2018/0349628 | A1* | 12/2018 | Bender ............... G06F 21/6218 |
| 2019/0108742 | A1* | 4/2019 | Stolbikov .............. G08B 19/00 |
| 2019/0258807 | A1* | 8/2019 | DiMaggio ............. G06F 21/577 |
| 2020/0074383 | A1* | 3/2020 | Smith ............. G06Q 10/063114 |
| 2020/0104777 | A1* | 4/2020 | Bouhini ................. G06N 20/00 |
| 2020/0218271 | A1* | 7/2020 | Krystek ................. G06F 16/285 |
| 2021/0007874 | A1* | 1/2021 | Galiana Bujanda ... B25J 9/0006 |
| 2021/0372561 | A1* | 12/2021 | Swift ................... A41D 13/002 |

FOREIGN PATENT DOCUMENTS

| | | |
|---|---|---|
| GB | 2491984 A | 12/2012 |
| WO | 2018158622 | 9/2018 |

OTHER PUBLICATIONS

Zhang et al., "Design of an Adaptive Human-Machine System Based on Dynamical Pattern Recognition of Cognitive Task-Load", frontiers in Neuroscience, Original Research, published Mar. 17, 2017, vol. 11, Article 129, 18 pages.

Mell et al., "The NIST Definition of Cloud Computing", Recommendations of the National Institute of Standards and Technology, Special Publication 800-145, Sep. 2011, 7 pages.

* cited by examiner

AUTO-ADJUSTABLE MACHINE FUNCTIONALITY USING ANALYTICS OF SENSOR DATA

BACKGROUND

The present invention relates generally to the field of computing, and more particularly to analytics and artificial intelligence (AI). Workplace accidents involving heavy machines or manufacturing equipment can be caused by factors such as operator training, skill level, focus or improper operation. Accidents may result in injury to the machine operator or surrounding employees.

SUMMARY

Embodiments of the present invention disclose a method, computer system, and a computer program product for a dynamic machine functionality. Embodiments of the present invention may include setting a threshold for a machine. Embodiments of the present invention may include setting one or more features of the machine available to a user based on the set threshold. Embodiments of the present invention may include determining the machine is being operated. Embodiments of the present invention may include collecting a plurality of data based on the machine operation. Embodiments of the present invention may include transmitting the plurality of data to a machine learning (ML) module. Embodiments of the present invention may include analyzing the collected plurality of data using the ML module. Embodiments of the present invention may include determining that at least one machine functionality of the one or more features should be adjusted based on analysis of the collected plurality of data. Embodiments of the present invention may include adjusting the at least one machine functionality.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method and program product for an auto-adjustable machine functionality. As such, embodiments of the present invention have the capacity to improve the field of machine functionality by configuring and adjusting one or more machine capacities, functionalities or mechanisms. More specifically, the machine functionality may be dynamically adjusted to enable or disable the machine features or activities based on one or more operator factors using measurements taken by multiple sensor devices that measure machine operator conditions and the surrounding environment conditions. The measurements may then be analyzed using artificial intelligence (AI) and machine learning (ML) to dynamically adjust the machine functionality during machine operation to ensure safe operation of the machine by a machine operator.

As previously described, machine operation accidents in a work environment can be caused by factors such as operator training, skill level, focus level, improper operation or machine malfunction. Additional factors that may cause occupational accidents by an operator may include an emotional state, a mental condition, a physical condition or a level of attention, stress or fatigue. Accidents may result in injuries to the machine operator or surrounding employees. A large number of work-related accidents and even work-related fatalities occur each year. Therefore, it may be advantageous to, among other things, dynamically adjust machine functionality based on data analytics of the operator and environmental data analytics to significantly reduce the number of occupational incidents.

Various industries utilize machines that are essential to the particular industry function. Some industries that may employ machine operators include construction, mining, transportation, agriculture, medical, entertainment or manufacturing industries. The machine may be varying in size from a machine used to treat a patient in a hospital room to heavy machinery that is used to build a high-rise building. Heavy machinery may include machines such as a hydraulic press, punching machines, drilling incinerators welding machines, cranes or tractors. An employee operating the machine may also be known as an operator, a user, or a worker.

According to an embodiment, user data and the environmental data are collected and analyzed to determine if the machine features during operation should be adjusted. Workplace accidents may be significantly reduced by dynamically adjusting machine features during machine operability, thus, creating a safe work environment. Some adjustable features may include, for example, motion limitations, velocity adjustments, acceleration adjustments, gear limitations, welding functions, drilling functions, cutting functions, honing features, lathing features, shearing features, grinding features, maximum cargo capacity, allowed cargo types (e.g., deny flammable cargo or allow inert material), hours of operation features, operator exigency features, broaching functions, rotating velocity adjustments, torque angle adjustments, angle of operation adjustments, electrical discharge limitations or industrial kiln temperature adjustments.

Data may be collected for transmission, storing and analysis using various devices. One device may include sensors or Internet of Things (IoT) devices. IoT devices may include devices embedded with software, sensors, data storage, central processing units and the ability to connect to a network or may even communicate with backend infrastructures. IoT devices may be associated with various items, such as machines, homes, buildings, vehicles, mobile devices, energy transmission, medical devices, infrastructure and other consumer applications. Various types of data measurements may be collected and transmitted by IoT devices, such as measurements relating to temperature, acceleration, velocity, distance, movement, smoke, air quality, radiation, buoyancy, dynamic movements, user data, machine data, vehicle characteristics, building security, motion detection, weight, weight of a load, electrical conductivity or electrical voltage level. Data may also be collected using cameras to collect image content or video content and microphones to collect noise levels or audio content.

User data collected for storing and analysis may include data collected from wearable devices, such as wearable sensors, or external devices. Wearable devices may include sensors that measure heart rate, blood pressure, pupil dilation or body temperature. For example, a smart watch to measure the heart rate of a user, optical sensor glasses to measure the pupil dilation of the user and a blood pressure monitor or a smart watch to measure the blood pressure of the user. Wearable devices may also be small sensors embedded in clothing, small sensors embedded on accessories such as glasses, watches, shoes, hats or communication mediums (e.g., walkie talkies or hand held two-way CB radios).

According to an embodiment, a machine functionality program may receive consent from a machine operator, via an opt-in feature or an opt-out feature, prior to commencing the collection of data or the monitoring and analyzing of the collected data. For example, in some embodiments, the machine functionality program may notify the user when the collection of data begins via a graphical user interface (GUI) or a screen on the machine device. According to other embodiments, the machine functionality program may notify the user when the collection of data begins via an external device, such as a wearable device. In each case, the operator is provided with a prompt or a notification to acknowledge an opt-in feature or an opt-out feature.

Environmental data collected by external devices and sensors for storing and analysis. External devices may include devices that measure, for example, the temperature, the humidity, the decibel levels, distances, a velocity, an acceleration, an environmental flammability level, a wind speed, a wind direction, an atmospheric pressure, an amount of light or an amount of visibility. The collected environmental data may be combined and analyzed to trigger actions relating to the machine operation. For example, if the analysis of the collected data meets a risk factor or a risk threshold predetermined by an individual, such as a company administrator, or a risk threshold determined by artificial intelligence (AI) or machine learning (ML), then the machine may be triggered to dynamically adjust the machine functionalities or capabilities. Each deployment of the machine may pose a risk threshold that varies for each user and the risk threshold may adjust based on factors relating to the user, factors relating to the environment and factors relating to the machine functionality.

User related thresholds may include limiting the machine functionality based on the user training, the mental state and the physical state of the user at the time of machine operation. For instance, if a user exhibits higher stress levels and lower attention or focus levels due to a lack of sleep the prior night, then the machine functionality may be more limited based on the fact that the higher stress levels and the lower focus levels pose a greater risk of an incident. Environment related thresholds that can affect the user and may then further limit the machine functionality may include, for example, lower visibility or higher machine cabin temperatures. Machine functionality thresholds may limit or expand machine functionality dependent on the user factors (i.e., operator factors) and the environment factors.

Machine functionality or machine features that can be adjusted, based on the collected data, may include features such as the rotation speed of a lathe, the angle and arm height on a crane, an arm movement speed on a crane, a maximum weight or load capacity of a claw, a punch machine interval setting between punches, a maximum torque of an engine, uninterrupted welding machine operation (e.g., seconds or minutes of uninterrupted welding), a maximum pressure in a chamber, a speed of a production line, a drilling machine speed and depth, a cutting machine speed and operation angle, an hydraulic press punching force in frequency or intervals, an incinerator or kiln temperature for the activation or deactivation of a lid opening, a machine self-cleaning function, a movement direction, a movement speed, a component temperature, a fork-lift moving speed or cargo weight or a terrain inclination on a fork-lift, tractor or other machines that can topple.

AI and ML may be used to leverage the collected data by analyzing the real-time collected data, such as data collected while the user operates the machine, and by analyzing the data stored in a repository that may include a history of data based on the user, the machine, the work environment or other industry related data (e.g., global machine statistics and level of risk associated with the machine). The collected and stored data may be analyzed using natural language processing (NLP), semantic analysis, sentiment analysis and other data analytics.

Semantic analysis may be used to infer the complexity of interactions, such as the meaning and intent of the collected data, both verbal and non-verbal. For example, verbal data may include data collected by a microphone that collects user dialog during machine operation for voice analysis to infer the stress level of the user. Non-verbal data may include, for example, text-based data or type written words, such as a text message, an instant message or an email message. Semantic analysis may also consider syntactic structures at various levels to infer meaning to phrases, sentences and paragraphs used by the user.

Sentiment analysis may be used to understand how communication may be received by a user or interpreted by an individual the user is communicating with. Sentiment analysis may be processed through, for example, voice identifier software received by a microphone, facial expression identifier software received by a camera or by biometric identifier software received by a wearable device such as a smart watch that measures heartrate. Sentiment may also be measured by the tone of voice of the individuals communicating and the syntactic tone in type-written messages, such as an email message.

Data analytics may be used to analyze of various data such as structured data, unstructured data, master data, transactional data, event data, temporal data, audio data and video data. The various data types may be transmitted across a communication network between devices such as a server, a sensor, an IoT device, a camera, a microphone, a personal computer, a smart phone, a tablet or a smart watch. The various data types may also be received and transmitted by the machine functionality program and stored on a database or on multiple databases for current analysis and future use.

The collected data that may be received as an input to a device may include both structured and unstructured data. Structured data may include data that is highly organized, such as a spreadsheet, relational database or data that is stored in a fixed field. Unstructured data may include data that is not organized and has an unconventional internal structure, such as a portable document format (PDF), an image, a presentation, a webpage, video content, audio content, an email, a word processing document or multimedia content. The received data may be processed through NLP to extract information that is meaningful the machine functionality program or to a user operating the machine. An NLP system may be created and trained by rules or machine learning.

According to an embodiment, a user may login to the device on the machine the user may be operating. The login process may include authentication procedures, such as via a user identification (ID) and password, a biometric recognition scan or a Bluetooth connected device that transmits user login data credentials and authentication. In response to the user authentication, the user data may be retrieved for analysis, such as user experience and history associated with the operation of the machine. The user data may be analyzed to set a starting threshold to enable machine features based on the retrieved user history and experience. If no user history is accessible or retrieved, a base threshold may be enabled on the machine.

During machine operation, real-time collected data may be received and stored. The collected data may include user data, such as a heart rate, a blood pressure, a body temperature, eye movements, a grip (e.g., on a steering wheel or a gear shift) and operator voice characteristics. The collected data may also include data relating to the surrounding environment, such as internal and external temperatures, humidity, noise level or decibel level, amount of light, movement around the machine or voices. The collected data metrics may be measured, for example, before, during or after the machine operation. The user may be notified when the data collection begins via a user device or a device on the machine. Additionally, the user history may be accessible to the employer of the machine operator (i.e., the user) when the user begins employment, such as the employer gaining permission via an employment contract that the user consents to data being collected while operating the machine for the purposes of workplace safety for both the user and co-workers.

The captured data, including the user history data and other users history data, may be analyzed continually, updated and stored for building and creating training data for a robust ML dataset and an accurate ML algorithm. A highly accurate ML algorithm may create accurate machine thresholds. AI and ML algorithms may include, for example, supervised learning algorithms, instance-based algorithms, regularization algorithms or association rule learning algorithms. Supervised learning may use, for example, a labeled dataset to train a ML model. Supervised learning algorithms may include the Naive Bayes classification, the Bayesian belief network, logistics regression or support vector machines. Instance-based algorithms may include the k-nearest neighbor algorithm, learning vector quantization, a self-organizing map or a locally weighted learning. Regularization algorithms may include ridge regression, least absolute shrinkage and selection operator, elastic net or least-angle regression. Association rule learning algorithms may include the Apirori algorithm or the Eclat algorithm.

Upon analysis of the captured data, machine features may be adjusted, enabled or disabled. Data history and real-time data may be continually analyzed or analyzed at specific time periods, such as upon user login and every 1 minute or every 5 minutes during operation. The frequency of the analysis may also vary for each sensor. Data may also be simultaneously analyzed as real-time data is transmitted to the machine functionality program, for example, if a biometric reading transmits a physical risk that hits a threshold (e.g., a fast heart rate that could be related to a heart attack or high blood pressure) then the machine may simultaneously begin a shutdown sequence and alert an employer or company administrator. Features may be enabled or disabled based on, for example, the anticipated or expected user stress level, the user current stress level, the user attention level, the environment visibility or the environment temperature. An example of anticipated user stress may include an analysis of a large number of hours that the user has logged for operating a machine in a shorter time period, the previous user logged experience and a current high risk environmental condition. At the end of the user operation, the user may log off. The logging off by the user may trigger the device on the machine to be disabled until the next user login. The user data from the machine operation session may be recorded and stored for future reference.

Figure 1:
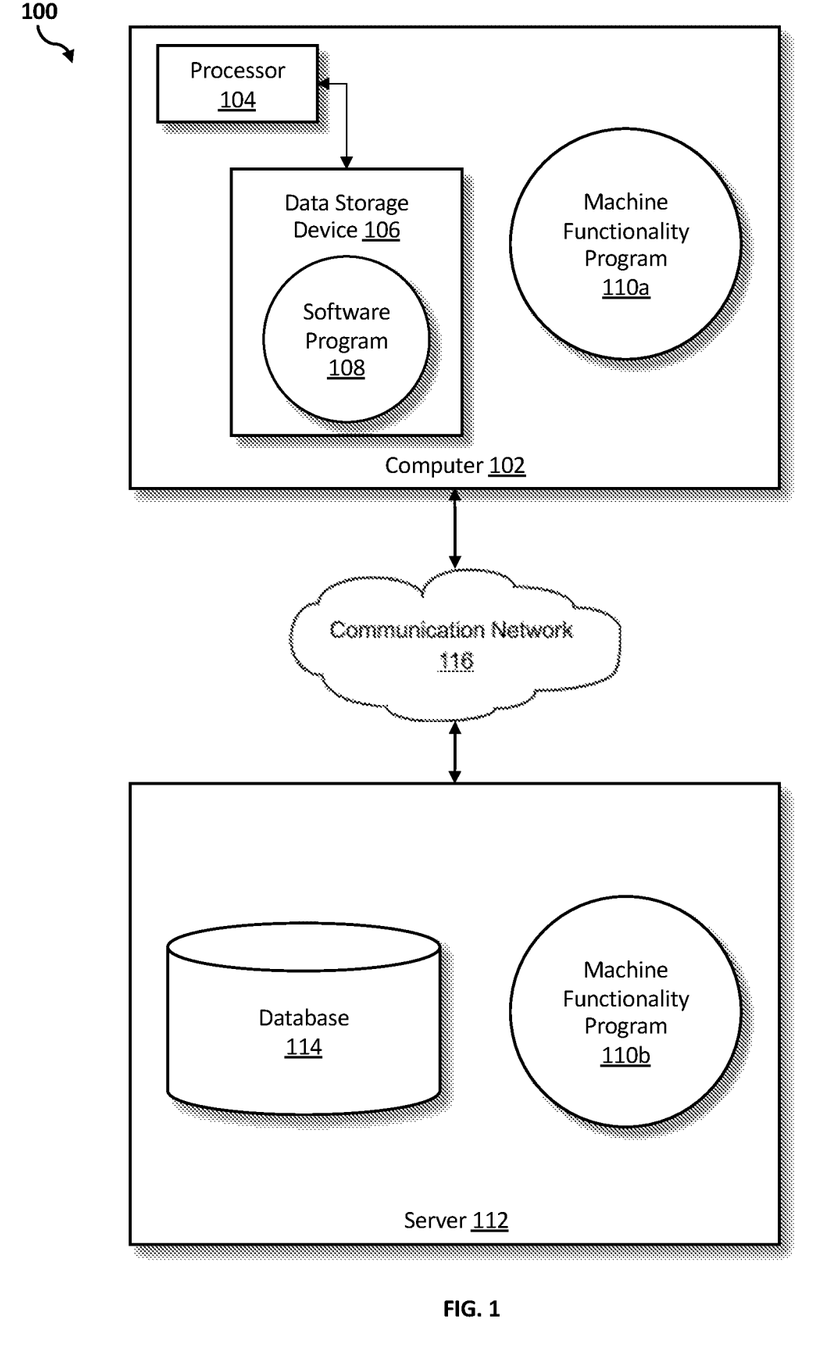
FIG. 1 illustrates a networked computer environment according to at least one embodiment.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a machine functionality program 110*a*. The networked computer environment 100 may also include a server 112 that is enabled to run a machine functionality program 110*b* that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902*a* and external components 904*a*, respectively, and client computer 102 may include internal components 902*b* and external components 904*b*, respectively. Server computer 112 may also operate in a cloud computing service model, such as Software as a Service (SaaS), Analytics as a Service (AaaS), Platform as a Service (PaaS), Blockchain as a Service (BaaS) or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the machine functionality program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the machine functionality program 110a, 110b (respectively) to create a safe work environment by dynamically adjusting machine features. The auto-adjustable machine functionality method is explained in more detail below with respect to FIG. 2.

Figure 2:
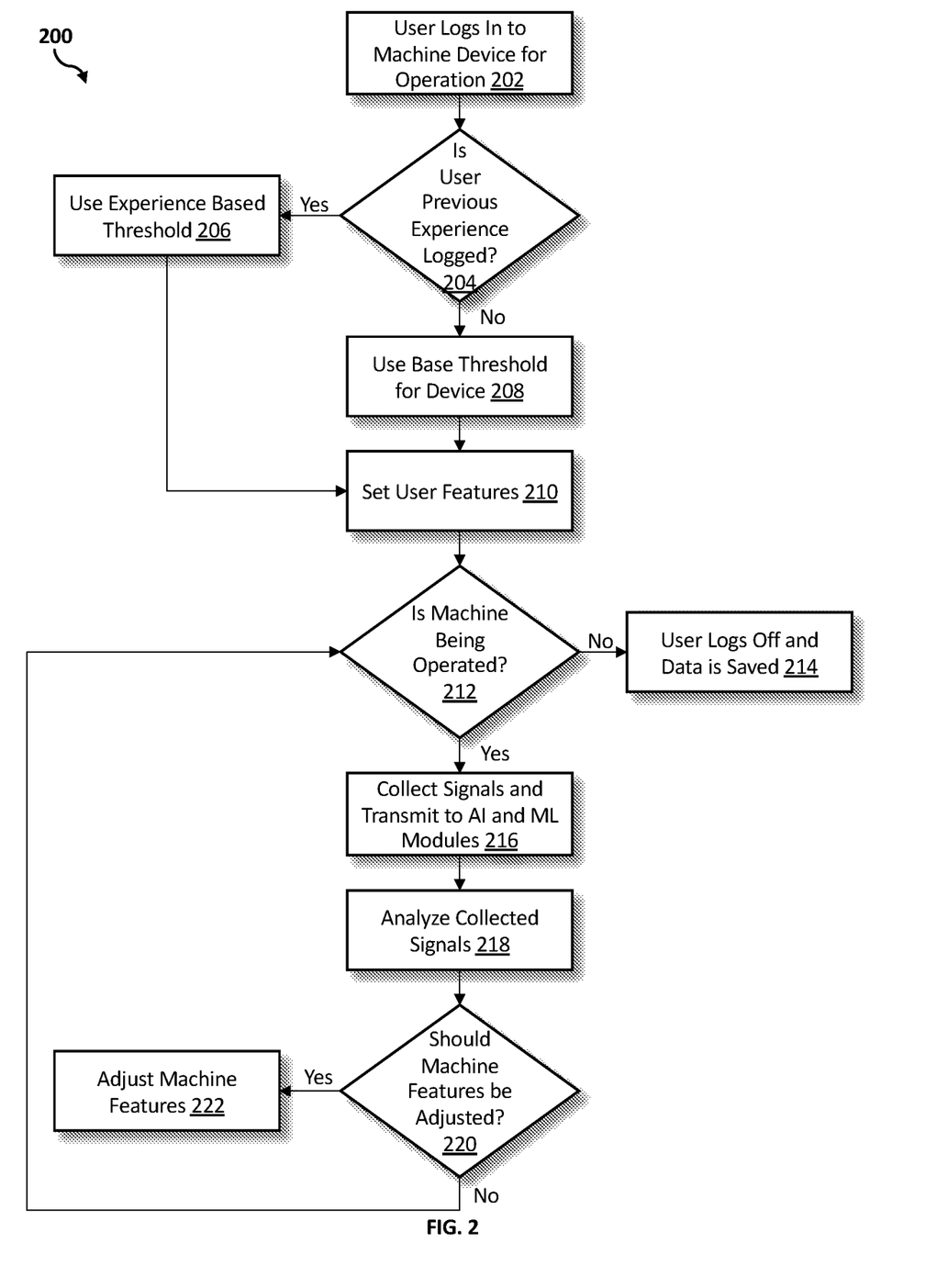
FIG. 2 is an operational flowchart illustrating a process for auto-adjustable machine functionality thresholds according to at least one embodiment.

At 202, a user logs into a machine device for operation. The machine device may include an electronic device attached to the machine, such as a console. The machine device may also be detached from the machine but electronically connected to the machine via a communication network 116, such as a handheld tablet device that connects to the machine account information and the user login data. The user may login to the machine device for authorization to access and operate the machine. The login and authorization process may incorporate one or more authentication methods.

In an embodiment, an authentication method may include the operator providing a user ID and password. In an alternate embodiment, the authentication method may include a Bluetooth connection to a wearable device of the user, such as a sensor that is attached to the user device that both stores user data and has access to user data. The wearable device may connect via Bluetooth to the machine device one a connection is established and the user data may be transmitted to the machine device for authorization, for example, when the machine operator gets within a specific distance of the machine, the machine will unlock the doors and allow the user the ability to start the machine. In an alternate embodiment, an authentication method may include biometric recognition, such as a fingerprint, a retina scan, facial recognition or voice recognition.

At 204, the machine functionality program 110a, 110b determines if the user has a previous experience logged. In response to user authorization and access to the machine device, the user data history may be retrieved from, for example, an employer database that resides on the premises of the employer or a database stored offsite, both databases being accessible by the machine device via a communication network 116. The user history may include data collected and stored relating to the previous experience of the user operating the machine. The user history may include data obtained from the previous or multiple previous operations of the machine by the user.

The user history may also include data collected relating to other machines, for example, similar machines that the user has operated at the current place of employment or at a previous place of employment. The user history data may be collected, entered and stored on an employer database by, for example, an administrator data entry of the user experience provided by the user at the beginning of the employment period, data that the user authorizes a previous place of employment to transfer to the new place of employment or by data mining a public database that may list user skills, such as a repository that stores resumes that the user has allowed the public to access.

For example, if the user A started a job at Company A 4 weeks ago and has operated Machine A for 10 days since the beginning of the employment period, then the history of user A collected is the data stored by the machine functionality program 110a, 110b for the 10 days of use plus any additional experience stored for user A. Upon beginning employment, user A had consented by signing an employment agreement to user A data being collected when in operation of the machine for the purposes of a safe work environment. User A also consented to the previous machine experience data to be transmitted from a previous employer of user A to Company A.

If the user has a history of data relating to the machine operation, then the data may be retrieved. Alternatively, if the user is a new user of the machine, then no data relating to the machine use may be stored for retrieval. A user may also, for example, have a history of operating a similar machine at a different company and the corresponding machine operator history by the user may be retrieved.

If the machine functionality program 110a, 110b determines that the user has a previous experience logged at 204, then an experience based threshold is used at 206. In response to the user history being retrieved at step 204, a starting experience based threshold may be set based on the user experience history. The retrieved user experience of the machine may include data pertaining to, for example, the amount of time the user has operated the machine, the type of work the user has performed, the previous environmental conditions the user has operated the machine in, the previous settings that were set for the user or the previous user collected data based on the user condition. Additional retrieved user experiences may include the amount of training hours the user has logged on the machine, the amount of supervised hours logged, the amount of unsupervised hours logged, the amount of hours the user has operated and logged on similar machines, the amount of hours the user has logged operating hazardous features of the machine in a current hazardous environmental condition or the amount of hours the user has logged operating the machine in a similar or normal environmental condition.

The user condition may include, for example, a stress level, a physical condition relating to health, an attention level, skill level or an amount of training. The experience based threshold may be set based on the user's previous set machine capability threshold or may be related to an updated machine capability threshold based on, for example, if the user data is changing such that the stress levels have been slightly but continually increasing over time or a significant stress level increase during the previous user history data entry.

A weight or a score given to the retrieved user history may vary, for example, a higher weight or score may be given to a user who has logged work hours on a specific machine using hazardous machine features in risky environmental conditions. A higher weight or score given to a user may represent a higher machine threshold that allows more machine functionality or the full machine functionality available to a user. The lower the weight or score given to a user may represent more restricted machine functionality to a user. For example, a user who has logged 10 hours of unsupervised machine working hours will be provided a weight that is higher than a user who has logged 10 hours of supervised machine working hours.

An example of user weights or scores provided upon retrieval of the user history may be arranged in order of a highest score to a lowest score. For instance, starting at a highest score, the machine functionality program 110a, 110b may arrange the weights as follows: working hours on the current machine using hazardous machine features and in hazardous conditions, then working hours on similar machines with similar hazardous features in a normal environment, then working hours on the same machine with deactivated hazardous machine features, then working hours on similar machines, then training hours on the machine and then focused training hours on specific machine features for a specific machine.

If the machine functionality program 100a, 110b determines that the user does not have a previous experience logged at 204, then a base threshold for the device is used at 208. The starting base threshold may, for example, be a default starting threshold set by the company based on a level of risk of the machine and the tasks that the machine is capable of performing. The base threshold may be used to constrict the machine capabilities, for example, in a higher level of risk environment or if the machine is highly difficult to operate. A base threshold may be calculated as a weight or a score and may provide more machine functionality for a higher score and less machine functionality for lower scores. For example, a machine that requires highly skilled operators with proper training to operate the machine may be considered a high risk for user error and a high risk of an incident occurring, therefore, a low score may be associated with the user and may create a base threshold to constrict the machine capabilities more than a machine that is considered simple to operate. Since the user does not have previous logged experience and a base threshold is set, the higher risk machine base threshold may be set at a higher constriction level than lower risk machines.

An alternate embodiment may set a base threshold based on a daily environmental condition, such as summertime in a high humidity environment may constrict the amount of time the user may operate the machine to enforce a break to ensure proper health and hydration. Additional environmental risks may include wind detection of high speed wind for crane operations, wood cutting or other outdoor activities. A windy day may, for example, restrict a user with a base threshold further by preventing a lift to operate above a certain number of meters or may reduce the allowed cargo weight. A nighttime operation, for example, may restrict a user with a base threshold further with score adjustments based on the availability of natural light.

An alternate daily environmental example may include a noise level that is more distracting than usual, thus, lowering the score, reducing the base threshold and further restricting the machine functionality. An additional environmental example may include a diminished air quality or higher polluting components that affects a user's ability to concentrate, thus, lowering the score, reducing the base threshold and further constricting the machine functionality.

At 210, the user features are set. The user features may be set based on the previous analyses. The available user features while operating a machine are determined based on the analyzed user scores and thresholds. The available user features while operating a machine may be constricted or expanded based on the determined scores and thresholds. The level of machine constriction or the level of available machine capabilities are related to the amount of risk based on the previously determined scores and thresholds. The higher the score and threshold, the more user features or machine capabilities will be available to the user. The lower the score and threshold will reduce the user features or machine capabilities allowed to the user.

For example, a fork-lift operator who has experience operating the fork-lift in an indoor setting during the day with ample light and visibility has a user features set at a high threshold of machine capability in the same setting. The same fork-lift operator working outdoor in the rain may have a lowered threshold, therefore, reducing the user features that day.

At 212, the machine functionality program 110a, 110b determines if the machine is being operated. The machine may be considered and determined to be in operation if, for example, the user is inside the machine and the machine is turned on. For example, a sensor may be attached to the seat and may measure a threshold of weight when a user is on the seat. A sensor may also be triggered if the door is opened or a sensor may detect the movement of the user entering the machine. Additional sensor examples may include a steering wheel sensor or a lever sensor that measures if the user is gripping the steering wheel or if the user is holding onto the lever. Cameras may be attached to the inside or outside of the machine and may visually recognize identified users operating the machine. Movement sensors may recognize the user inside the machine. Sounds sensors may perform speech recognition analysis to determine that an identified user is operating the machine.

If the machine functionality program 110a, 110b determines that the machine is not being operated at 212, then the user logs off and the data is saved at 214. When the user stops using the machine the machine device may log the user off, disable the machine, disable the machine device or disable some higher risk machine capabilities. The latest and most current data from the user session may be recorded and stored on a database for future reference, analysis or user thresholds.

If the machine functionality program 110a, 110b determines that the machine is being operated at 212, then signals are collected and transmitted to AI and ML modules at 216. During user operation of the machine, signals and data may be collected from the multiple devices, such as sensors, IoT devices, wearable devices, or external devices. The signals and data may be collected from the user or from the surrounding environment. The collected user real-time data may include data relating to the user heart rate, blood pressure, body temperature, body movement accelerometers, sight focus, voice characteristics or pupil dilation. The collected environment real-time data may include the temperature, the humidity, a noise level or a decibel level, a user's voice, an individual's voice in the surrounding environment, the amount of light, the time of day or the movement around the machine.

The data may be collected during the operation of the machine or during the period of time that the machine is enabled. Machine features may be enabled or disabled based on various factors, such as the time of day, the operator precision (e.g., smooth operation of the machine or erratic operation of the machine), a set period of time, previous or current issues that occurred during operation, machine function or disfunction (e.g., machine maintenance).

The collected signals and data may be transmitted to AI and ML modules simultaneously or in real-time, as the data is collected, in a time period or at specific times. For example, the collected signals and data may be continually being received and transmitted to the AI and ML modules in real-time or the collected signals and data may be received and transmitted over time periods, such as every 30 seconds or every 5 minutes while the machine is in operation. The time period may vary based on user experience and environmental conditions.

At 218, the collected signals are analyzed. The received signals and data may be analyzed using AI and ML modules.

The AI and ML modules may be trained by various algorithms that may retrieve data from a repository relating to the company or the machine. Supervised ML and semi-supervised ML may be used. Semi-supervised ML may allow training sets and datasets to be updated by an employee or a SME to further create an accurate model (e.g., using ground truth) for the collected data.

Linear classifiers, such as a Bayesian classifier, may be used to define or isolate independent factors and individual scores such as the weather has gone from not windy to windy or the blood pressure of a user has gone from normal to higher than expected. Support vector machines or neural networks may be used to calculate a probability of an accident considering multiple variables and scores, such as the operator experience level, the environmental readings, the machine sensor data, the operator biological readings or the voice analyzed readings. Linear regression or logistic regression may be used to assign and adapt weights to the readings. For example, wind speeds that exceed 30 kilometers per hour is a dangerous condition for cranes higher than 15 meters that are capable of lifting more than 10 tons. Another example may include a adapting the weights based on a cutting machine being used by a less experienced operator, thereby lowering the frequency interval for the cutting head.

A decision tree classifier may be used to determine which machine features should be activated or deactivated based on a series of combined factors. For instance, an seasoned crane operator is experiencing extreme wind while the moving a heavy cargo container which is causing an accelerated heartbeat and a strong grip on the steering wheel. The series of combined factors are presenting conditions that are in flux and the decision tree classifier may reclassify the score to reduce the machine capability until the risky conditions recede. A K-nearest neighbor algorithm may be used to determine the thresholds and to calculate standard probabilities of an accidents. For example, the algorithm may cluster environmental readings, weather conditions or operator biological readings to set thresholds.

The AI and ML modules may learn from current machine operation status and may update user experiences and base thresholds. The AI and ML modules may also detect and determine anomalies for a user compared to a previous user machine operation experience. User experiences and base thresholds are updated as data is collected and analyzed. For instance, a user logging more hours in hazardous conditions while keeping healthy biological readings may be considered a user experience that will adjust the experience-based threshold to a higher threshold either during the current operation or for the next user operation. Learned insights and user experience may be saved to a database or to a storage device for future use during future machine operation cycles.

At 220, the machine functionality program 110a, 110b determines if the machine features should be adjusted. The collected and analyzed data processed by the AI and ML modules in step 218 be used to determine if the machine features should be adjusted. Both recently gained insights, such as newly received collected user and environmental data, may be used and previously defined rules may be used. Previously defined rules may include, for example, a minimum required number of hours operating a machine or a minimum number of supervised hours operating a machine.

The decision to enable, limit or disable machine features and activities may be based on, for example, the user stress level, attention level and mental state. A decision to disable a machine feature based on the user stress level may, for example, include a user that has a heartbeat that is elevated by 10% from the previous operation of the machine. Environmental risks to the user, such as extreme temperatures, high humidity, noise level and low visibility may also be determining factors. Other employees, individuals or animals near the machine may also create a risk and if present and determined to be a risk, the machine functionality program 110a, 110b may further limit or enforce machine functions to counteract the risk.

For example, an elevated risk situation may include the machine operator having elevated levels of stress and a lack of mental attention while a co-worker near the machine is conversing with the machine operator. Sensors and voice detectors may collect the movement and voice data and measurements and the provided by the collected data containing high temperature and high humidity may create a risk level such that the machine is determined to breach a risk threshold.

If the machine functionality program 110a, 110b determines that the machine features should be adjusted at 220, then the machine features are adjusted at 222. Continuing from the previous elevated risk example, the machine functionalities, such as the speed and movements may be restricted until the machine operator distractions have ceased. For example, if the user has decided to take a break once the machine functionality has been limited, the machine may keep measuring real-time collected data and when the user returns with lower stress and higher attention levels, the machine functionality may be restored to the previous, less limited features.

The machine device may receive instructions from the AI and ML modules to keep or adjust the machine features while the machine is in operation. If the risk level changes or crosses a threshold risk level then the machine features will adjust accordingly. For example, the higher the risk the more restricted the machine may become and the machine may even possibly cease operation. The lower the risk the less restrictive adjustments to the machine functionality may be made. The user may be informed of the machine functionality adjustments in various ways, such as via voice message on machine device or console or via a message on a smart watch. The collected signals and data may continue to be collected while the machine is in operation.

It the machine functionality program 110a, 110b determines that the machine features should not change at 220, then the machine functionality program 110a, 110b repeats the process beginning at step 212 and determines if the machine is being operated.

Referring now to FIG. 2, an operational flowchart illustrating the exemplary auto-adjustable machine functionality process 200 used by the machine functionality program 110a, 110b according to at least one embodiment is depicted.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
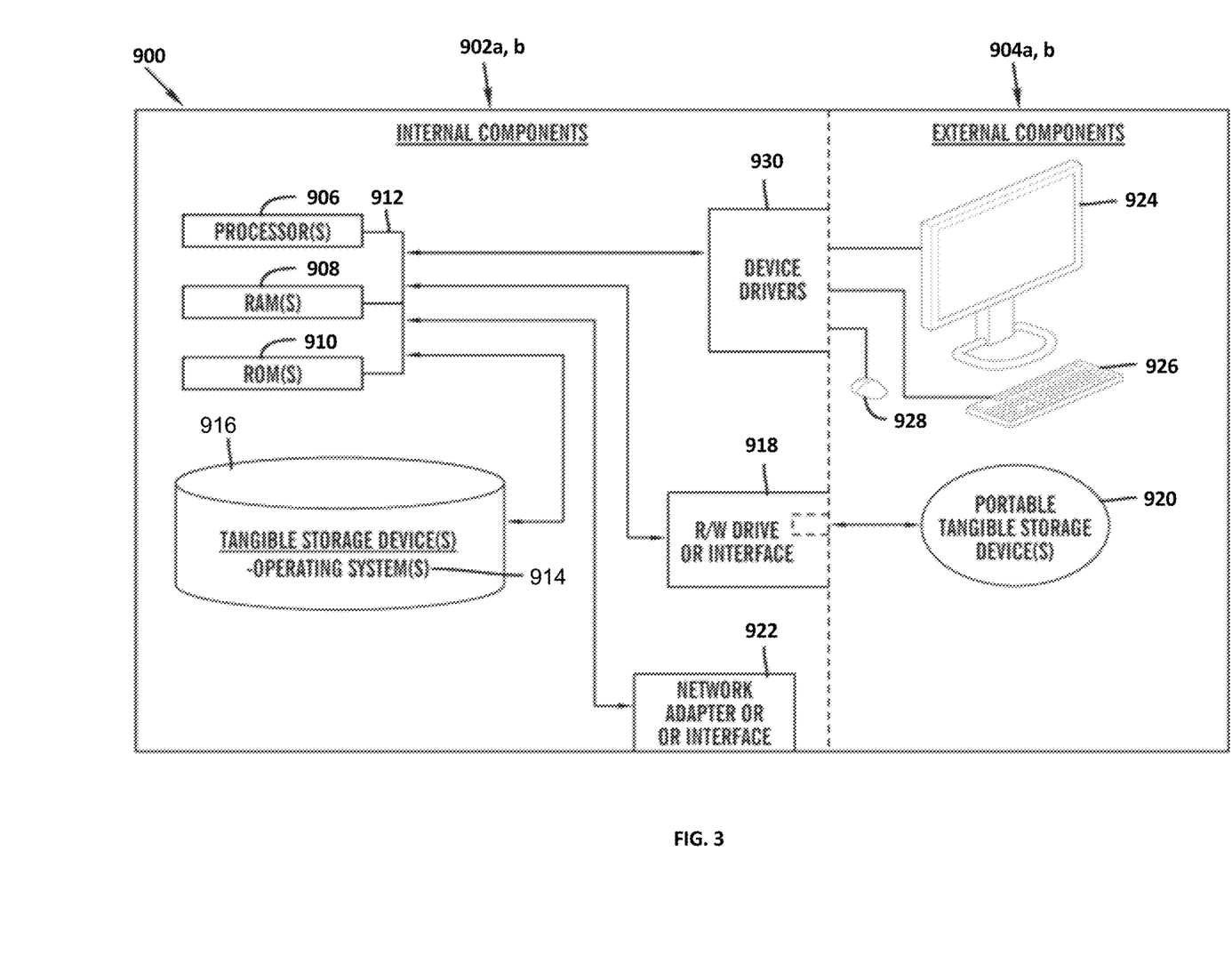
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the machine functionality program 110a in client computer 102, and the machine functionality program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the machine functionality program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the machine functionality program 110a in client computer 102 and the machine functionality program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the machine functionality program 110a in client computer 102 and the machine functionality program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure or on a hybrid cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
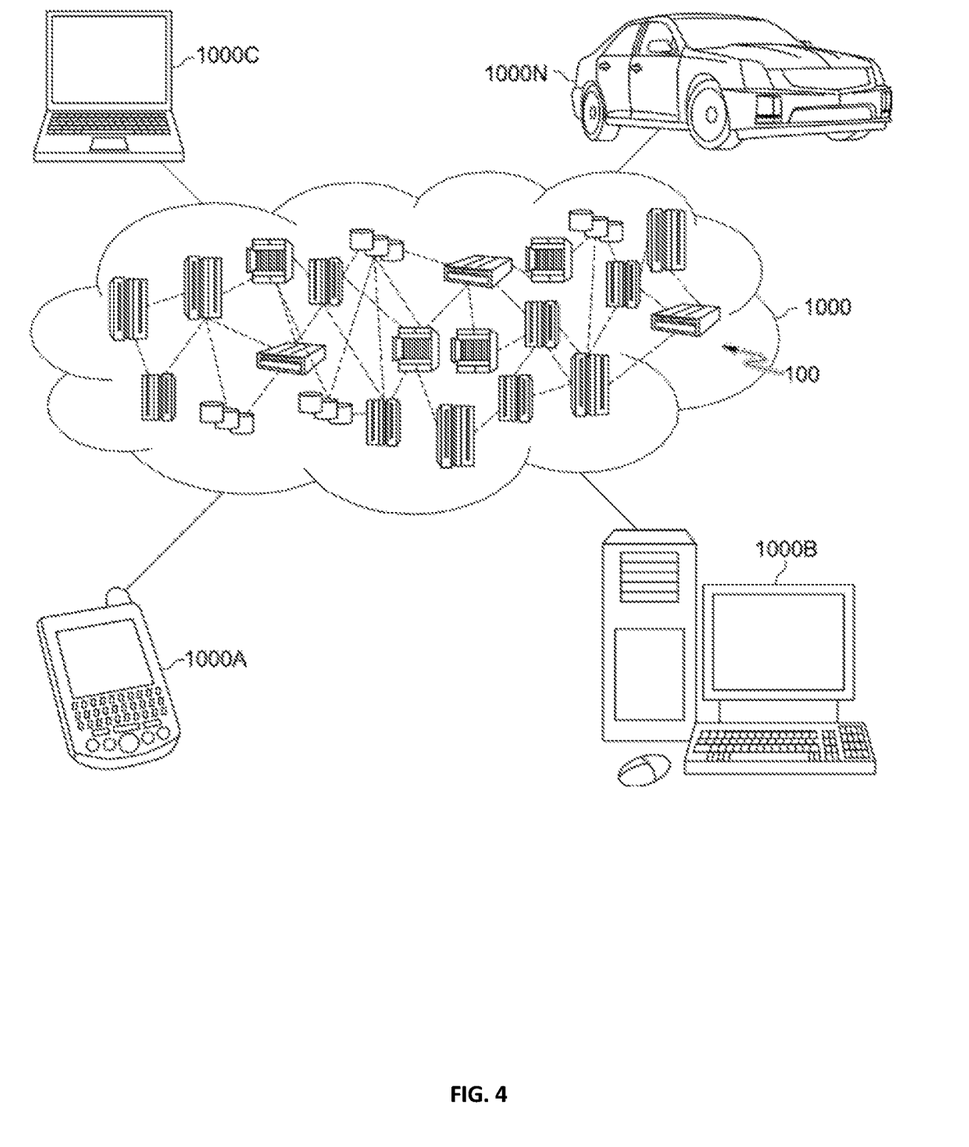
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
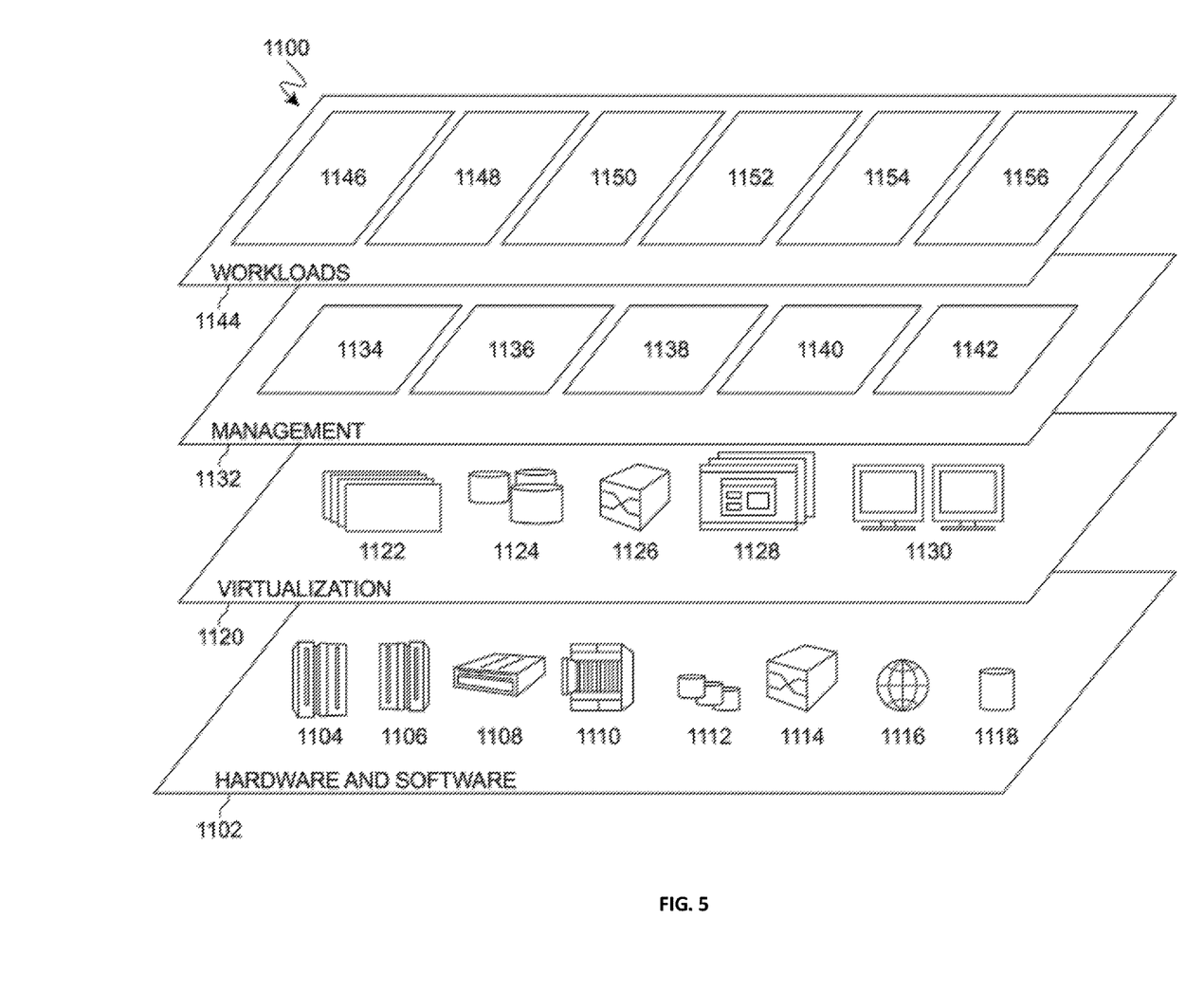
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and machine functionality adjustments 1156. A machine functionality program 110a, 110b provides a way to dynamically adjust the functionality of a machine while the machine is in operation to increase safety measures in the work environment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for a dynamic machine functionality, the method comprising:
    training, by a machine learning module of a computing device, a machine learning model associated with a machine with inputs based on historic user data regarding operation sessions of the machine, wherein the machine learning model is configured to generate user-specific base risk thresholds for triggering automatic changes between respective predetermined configurations of machine functionality, wherein the user-specific base risk thresholds include a risk of an accident during operation of the machine by a user;
    continuously collecting, by the machine learning module of the computing device during operation of the machine by the user, user data related to the operation of the machine by the user and environment data related to environment conditions surrounding the machine, wherein the user data and environment data measure variables in flux, and wherein the machine is set at an initial configuration of machine functionality based on a base risk threshold of the user from the user-specific base risk thresholds, and wherein the base risk threshold is based on a user's historic experience related to the machine, including an amount of time the user has spent operating the machine, and the base risk threshold includes a level of risk in operating the machine and tasks that the machine is configured to perform;
    continuously analyzing, by the machine learning module of the computing device during the operation of the machine by the user, the collected user data and environment data to determine the risk of an accident based on the variables in flux;
    automatically adjusting, by the computing device using the machine learning model, the base risk threshold of the user to a second risk threshold of the user based on the analysis of the collected user data including a new amount of time the user has spent operating the machine during a current operation of the machine, environment data, and stored rules;
    sending, by the computing device, instructions to cause a computer to change the initial configuration of machine functionality to a new configuration of machine functionality during the operation of the machine by the user based on the second risk threshold of the user; and
    updating, by the machine learning module of the computing device, the machine learning model based on the user data, such that the machine learning model is configured to generate updated user-specific base risk thresholds.

2. The method of claim 1, further comprising:
    assigning, by the computing device, a user experience score to the user, wherein the user's historic experience related to the machine comprises the user experience score, wherein the user experience score is determined based on the user's previously logged machine operation experience, wherein the user experience score is weighted based on logged hours operating a particular machine, the level of risk in operating the particular machine in high risk environmental conditions, how hazardous the particular machine is to operate, and a level of the particular machine functionality that is available to the user.

3. The method of claim 1, wherein the base risk threshold of the user is a default threshold.

4. The method of claim 1, wherein the user data includes a user stress level, and wherein the environment data includes a measurement of: temperature, humidity level, wind speed and visibility level.

5. The method of claim 1, wherein the user data and environmental data is collected using sensors, internet of things (IoT) devices, smart watches and wearable devices, wherein the analyses determines the operation has an anomaly compared to a previous user machine operation experience.

6. The method of claim 1, wherein the initial configuration of machine functionality includes more functions than the new configuration of machine functionality, and the new configuration of machine functionality lowers a risk of an incident with the machine.

7. A computer system for a dynamic machine functionality, comprising:
    one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
    training, by a machine learning module, a machine learning model associated with a machine with inputs based on historic user data regarding operation sessions of the machine, wherein the machine learning model is configured to generate user-specific base risk thresholds for triggering automatic changes between respective predetermined configurations of machine functionality, wherein the user-specific base risk thresholds include a risk of an accident during operation of the machine by a user;
    setting, by the machine learning module, a base risk threshold from the user-specific base risk thresholds for the machine that is associated with the user that operates the machine, wherein the base risk threshold for the machine is based on a user experience score of the historic user data, wherein the user experience score is based on an amount of time the user has spent operating the machine, and the base risk threshold includes a level of risk in operating the machine and tasks that the machine is configured to perform;
    continuously collecting, by the machine learning module during operation of the machine by the user, user data related to the operation of the machine by the user and environment data related to environment conditions surrounding the machine, and wherein the machine is set at an initial configuration of machine functionality based on the base risk threshold for the machine;
    continuously analyzing, by the machine learning module during the operation of the machine by the user, the collected user data and the environment data to determine the risk of an accident;

automatically adjusting, by the machine learning module using the machine learning model, the base risk threshold for the machine to a second risk threshold for the machine based on the analysis of the collected user data including a new amount of time the user has spent operating the machine during a current operation of the machine and the environment data;

determining whether to expand machine functionality or limit machine functionality based on the second risk threshold for the machine;

sending instructions to cause a computer to change the initial configuration of machine functionality to a new configuration of machine functionality during the operation of the machine by the user based on the determining whether to expand machine functionality or limit machine functionality; and updating, by the machine learning module, the machine learning model based on the user data, such that the machine learning model is configured to generate updated user-specific base risk thresholds.

8. The computer system of claim 7 wherein the user experience score is determined based on the user's previously logged machine operation experience, wherein the experience score is weighted based on logged hours operating a particular machine, the level of risk in operating the particular machine in high risk environmental conditions, how hazardous the particular machine is to operate and a level of the particular machine functionality that is available to the user.

9. The computer system of claim 7, wherein the base risk threshold is a default threshold.

10. The computer system of claim 7, wherein the user data includes a user stress level, and wherein the environment data includes measuring a temperature, a humidity level, a wind speed and a visibility level.

11. The computer system of claim 7, wherein the user data and the environmental data is collected using sensors, internet of things (IoT) devices, smart watches and wearable devices, and wherein the continuously analyzing the collected user data and the environment data to determine the probability of an accident determines the operation of the machine has an anomaly compared to a previous user machine operation experience.

12. The computer system of claim 7, wherein the initial configuration of machine functionality includes more functions than the new configuration of machine functionality, and the new configuration of machine functionality lowers a risk of an incident with the machine.

13. A computer program product for a dynamic machine functionality, comprising:
one or more computer-readable tangible storage media and program instructions stored on at least one of the one or more computer-readable tangible storage media, the program instructions executable by a processor to cause the processor to perform a method comprising:
training, by a machine learning module, a machine learning model associated with a machine with inputs based on historic user data regarding operation sessions of the machine, wherein the machine learning model is configured to generate user-specific base risk thresholds for triggering automatic changes between respective predetermined configurations of machine functionality, wherein the user-specific base risk thresholds include a risk of an accident during operation of the machine by a user;
setting, by the machine learning module, a base risk threshold from the user-specific base risk thresholds for the machine that is associated with the user that operates the machine, wherein the base risk threshold is an experience based threshold determined based on a user experience score of the historic user data, wherein the user experience score is based on an amount of time the user has spent operating the machine, and the base risk threshold includes a level of risk in operating the machine and tasks that the machine is configured to perform;

continuously collecting, by the machine learning module during operation of the machine by the user, user data related to the operation of the machine by the user and the environment data related to environment conditions surrounding the machine, and wherein the machine is set at an initial configuration of machine functionality based on the base risk threshold;

continuously analyzing, by the machine learning module during the operation of the machine by the user, the collected user data and the environment data to determine a probability of an accident;

automatically adjusting, by the machine learning module, the base risk threshold to a second risk threshold based on the analysis of the collected user data including a new amount of time the user has spent operating the machine during a current operation of the machine and the environment data;

sending instructions to cause a computer to change the initial configuration of machine functionality to a new configuration of machine functionality during the operation of the machine by the user based on the second risk threshold; and updating, by the machine learning module, the machine learning model based on the user data, such that the machine learning model is configured to generate updated user-specific base risk thresholds.

14. The computer program product of claim 13 wherein the user experience score is determined based on the user's previously logged machine operation experience, wherein the user experience score is weighted based on logged hours operating a particular machine, the level of risk in operating the particular machine in high risk environmental conditions, how hazardous the particular machine is to operate and a level of the particular machine functionality that is available to the user.

15. The computer program product of claim 13, wherein the base risk threshold is a default threshold.

16. The computer program product of claim 13, wherein the user data includes a user stress level, and wherein the environment data includes measuring a temperature, a humidity level, a wind speed and a visibility level.

17. The computer program product of claim 13, wherein the user data and the environmental data is collected using sensors, internet of things (IoT) devices, smart watches and wearable devices, wherein the analyzing the collected user data and the environment data to determine the probability of an accident determines the operation of the machine has an anomaly compared to a previous user machine operation experience.

18. The method of claim 1, wherein the initial configuration of machine functionality includes fewer functions than the new configuration of machine functionality, such that the instructions cause the computer to increase the functions of the machine.

19. The computer system of claim 7, wherein:
the initial configuration of machine functionality includes fewer functions than the new configuration of machine functionality, such that the instructions cause the computer to increase the functions of the machine; and the continuously analyzing utilizes an analysis tool selected from the group consisting of:

linear classifiers to define independent factors, neural networks to calculate probabilities, linear regression to identify weights, and decision tree classifiers to determine machine functions that should be activated or deactivated.

20. The computer program product of claim 13, wherein the initial configuration of machine functionality includes fewer functions than the new configuration of machine functionality, such that the instructions cause the computer to increase the functions of the machine.

\* \* \* \* \*